(12) United States Patent
Kaneko et al.

(10) Patent No.: US 7,203,588 B2
(45) Date of Patent: Apr. 10, 2007

(54) CONTROL DEVICE FOR MULTI-CYLINDER INTERNAL COMBUSTION ENGINE AND SIGNALING DEVICE CAPABLE OF PROVIDING SAME WITH INFORMATION

(75) Inventors: Takashi Kaneko, Sagamihara (JP); Akihide Okajima, Sagamihara (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 10/975,460

(22) Filed: Oct. 29, 2004

(65) Prior Publication Data

US 2005/0143898 A1    Jun. 30, 2005

(30) Foreign Application Priority Data

Dec. 26, 2003  (JP) ............................. 2003-432215

(51) Int. Cl.
  *F02D 29/00*   (2006.01)
  *G01F 19/00*   (2006.01)

(52) U.S. Cl. ....................... 701/103; 123/481

(58) Field of Classification Search ................ 701/101, 701/102, 103; 123/480, 481, 198 F, 198 DB, 123/90.15, 90.17
See application file for complete search history.

(56) References Cited

U.S. PATENT DOCUMENTS 6,435,156 B1    8/2002    Copus 6,688,275 B2 *  2/2004    Shindou et al. .......... 123/198 F
2002/0189574 A1  12/2002  Kim
2003/0154711 A1  8/2003   Hayman et al.
2003/0164148 A1  9/2003   Andrian-Werburg

FOREIGN PATENT DOCUMENTS

| DE | 3019709 A1 | 12/1981 |
| DE | 8231178 U1 | 3/1984 |
| JP | 10-299531 A | 11/1998 |
| JP | 2001-230980 A | 8/2001 |
| JP | 2003-56376 A | 2/2003 |

* cited by examiner

*Primary Examiner*—Hieu T. Vo
(74) *Attorney, Agent, or Firm*—Birch, Stewart, Kolasch & Birch, LLP

(57) ABSTRACT

A control device for an engine, which includes a plurality of cylinders, an electronically controlled unit injector for injecting fuel into each cylinder, and an electronically controlled valve train for opening and closing an intake valve and an exhaust valve of each cylinder, comprises an operating state detection unit for detecting the operating state of the engine, and electronic control units for performing an idle cut operation, in which fuel injection into some of the cylinders is stopped, and the intake valve and the exhaust valve of the cylinder concerned are kept closed, if the signal switching time is long when the idling of the engine of a vehicle waiting at traffic lights is detected by the operating state detection unit.

10 Claims, 9 Drawing Sheets

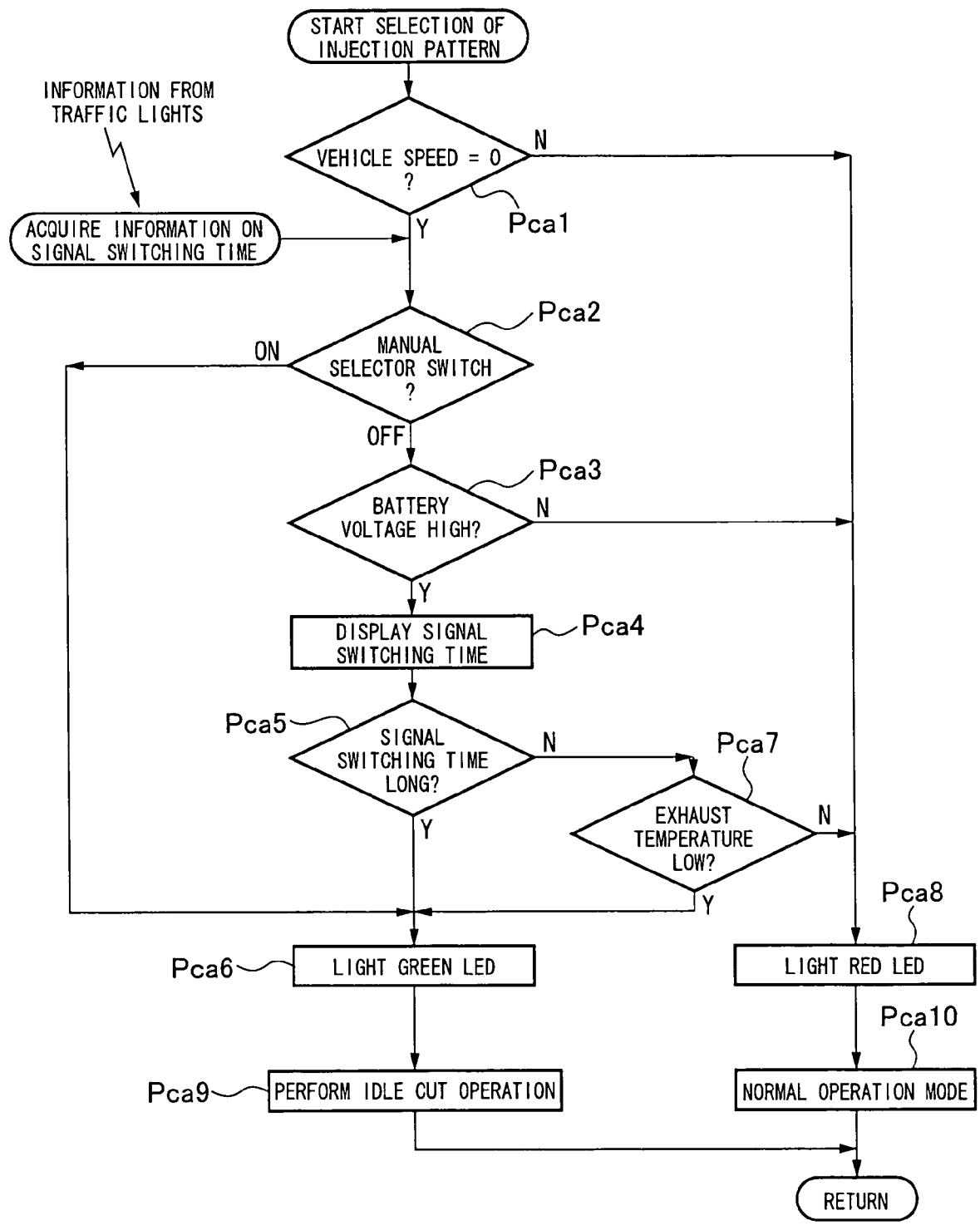
Fig.6-A

CONTROL DEVICE FOR MULTI-CYLINDER INTERNAL COMBUSTION ENGINE AND SIGNALING DEVICE CAPABLE OF PROVIDING SAME WITH INFORMATION

CROSS REFERENCE TO RELATED APPLICATION

The entire disclosure of Japanese Patent Application No. 2003-432215 filed on Dec. 26, 2003, including specification, claims, drawings and summary, is incorporated herein by reference in its entirety.

BACKGROUND OF THE INVENTION

1. Field of the Invention

This invention relates to a control device for a multi-cylinder internal combustion engine in a vehicle, such as an automobile, or a stationary multi-cylinder internal combustion engine, and a signaling device capable of providing the control device with information. More specifically, the invention relates to the control device and the signaling device preferred for a multi-cylinder internal combustion engine which can perform a cylinder number control operation permitting some of the cylinders to rest without working.

2. Description of the Related Art

A vehicle, such as an automobile, is often compelled to stop transiently by traffic signals while running in an urban district. Even in such a case, the internal combustion engine (hereinafter referred to simply as an engine) installed on the vehicle continues idling, posing the problems of generating an exhaust gas and wasting fuel.

To resolve these problems, a proposal has been made to carry out an idle stop for bringing the engine to a halt manually or automatically when the vehicle makes a brief stop, thereby decreasing the exhaust gas or improving fuel economy (see Japanese Patent Application Laid-Open No. 2003-247439; hereinafter referred to as Patent Document 1). Even if the vehicle is at a stop without doubt, however, it may be inappropriate to perform an idle stop from the aspects of safety and functionality. Hence, it has been common practice to exercise idle stop control, namely, control such that many authorization conditions for authorizing an idle stop are set, and only when all of the authorization conditions for the idle stop have been satisfied, the idle stop is executed.

With the idle stop control as disclosed in Patent Document 1, however, the operation of all the cylinders is temporarily stopped. Thus, when the engine is restarted, the activity of posttreatment devices, such as DPF, NOx reduction catalyst, and oxidation catalyst, declines because of a fall in the exhaust gas temperature, thus aggravating exhaust emissions, and resulting in the increased frequency of driving a self-starting motor, which leads to the wear of this motor at an early stage. When the vehicle restarts, moreover, it is also indispensable to provide a check mechanism for a braking pressure, and detect the state of a transmission, for the purpose of preventing dangers. This presents the drawback that a control system becomes complicated, inducing cost increases.

SUMMARY OF THE INVENTION

The present invention has been accomplished in the light of the above-mentioned problems. It is the object of the invention to achieve improved fuel economy, minimum pollution, and cost reduction effectively, by performing a cylinder number control operation which leaves some of cylinders at rest, without working them, under predetermined conditions during a light- or medium-load operation including idling.

A control device for a multi-cylinder internal combustion engine according to the present invention, for attaining the above-mentioned object, is a control device for a multi-cylinder internal combustion engine including a plurality of cylinders, an electronically controlled fuel injection system for injecting fuel into each of the cylinders, and an electronically controlled valve train for opening and closing an intake valve and an exhaust valve of each of the cylinders, the control device comprising:

operating state detection means for detecting an operating state of the internal combustion engine; and control means for performing a cylinder number control operation, in which fuel injection into some of the cylinders is stopped, and the intake valve and the exhaust valve of the cylinder concerned are kept closed, under predetermined conditions when a low- to medium-load operating state, including idling, is detected by the operating state detection means.

The control means may change the cylinder undergoing the cylinder number control operation, or the number of the cylinder, in accordance with the operating state of the internal combustion engine.

The control means may perform the cylinder number control operation based on switching time information on traffic signals, or an external command from a manual selector switch.

The control means may acquire the switching time information on traffic signals via a receiver which receives the switching time information on traffic signals transmitted by a signaling device.

The receiver may be an on-board instrument on ETC.

The control means may incorporate an algorithm for determining, based on the operating state of the internal combustion engine and switching time information on traffic signals, whether it is advantageous to an environment to change the cylinder undergoing the cylinder number control operation, or the number of the cylinder.

The control means may perform the cylinder number control operation when the low- to medium-load operating state, including idling, whose duration has exceeded a predetermined time, is detected by a timer.

A signaling device according to the present invention is a signaling device capable of providing information to a control device for a multi-cylinder internal combustion engine, the internal combustion engine including a plurality of cylinders, an electronically controlled fuel injection system for injecting fuel into each of the cylinders, and an electronically controlled valve train for opening and closing an intake valve and an exhaust valve of each of the cylinders, the control device comprising operating state detection means for detecting an operating state of the internal combustion engine, and control means for performing a cylinder number control operation, in which fuel injection into some of the cylinders is stopped, and the intake valve and the exhaust valve of the cylinder concerned are kept closed, under predetermined conditions when a low- to medium-load operating state, including idling, is detected by the operating state detection means, the signaling device being adapted to display information on a time in which a traffic signal is switched from red to green, or to transmit the information to the control means by a radio wave or a like.

According to the present invention with the above-described features, when a low- to medium-load operation, including idling, is performed, fuel injection into some of the cylinders is shut off, and the intake valve and the exhaust valve of the cylinder concerned are kept closed. In the cylinders other than the resting cylinder out of operation, therefore, the amount of fuel injection per cylinder is increased, with the result that the exhaust gas temperature rises, and the ignition of the engine is stabilized. Thus, a broader fuel injection timing can be selected, and better fuel economy or less pollution can be achieved. Moreover, pumping losses are decreased by the adiabatic compression and expansion of the resting cylinder, with the result that even better fuel economy is achieved. As contrasted with idle stop control, moreover, there is no need for a safety device or a checking mechanism at the restart of the vehicle. Thus, the control system can be simplified.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 6-A is a flow chart for selection of an injection pattern showing Embodiment 3 of the present invention;

DETAILED DESCRIPTION OF THE INVENTION

A control device for a multi-cylinder internal combustion engine, and a signaling device capable of providing the control device with information, in accordance with the present invention, will now be described in detail by embodiments with reference to the accompanying drawings, but the invention is not limited by the embodiments.

Embodiment 1

Figure 1:
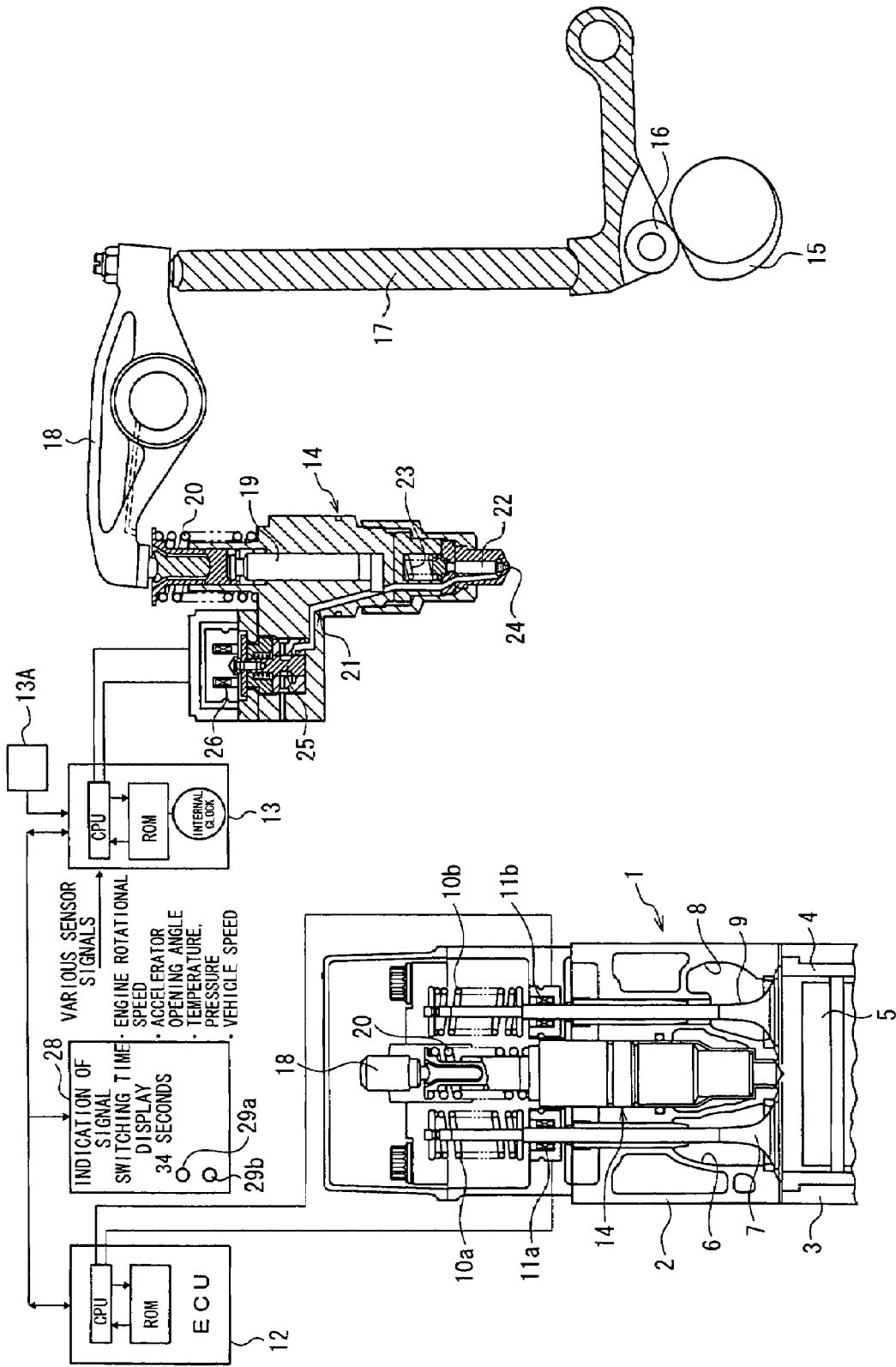
FIG. 1 is a structural explanation drawing of a multi-cylinder internal combustion engine in a vehicle, such as an automobile, showing Embodiment 1 of the present invention.
Figure 2:
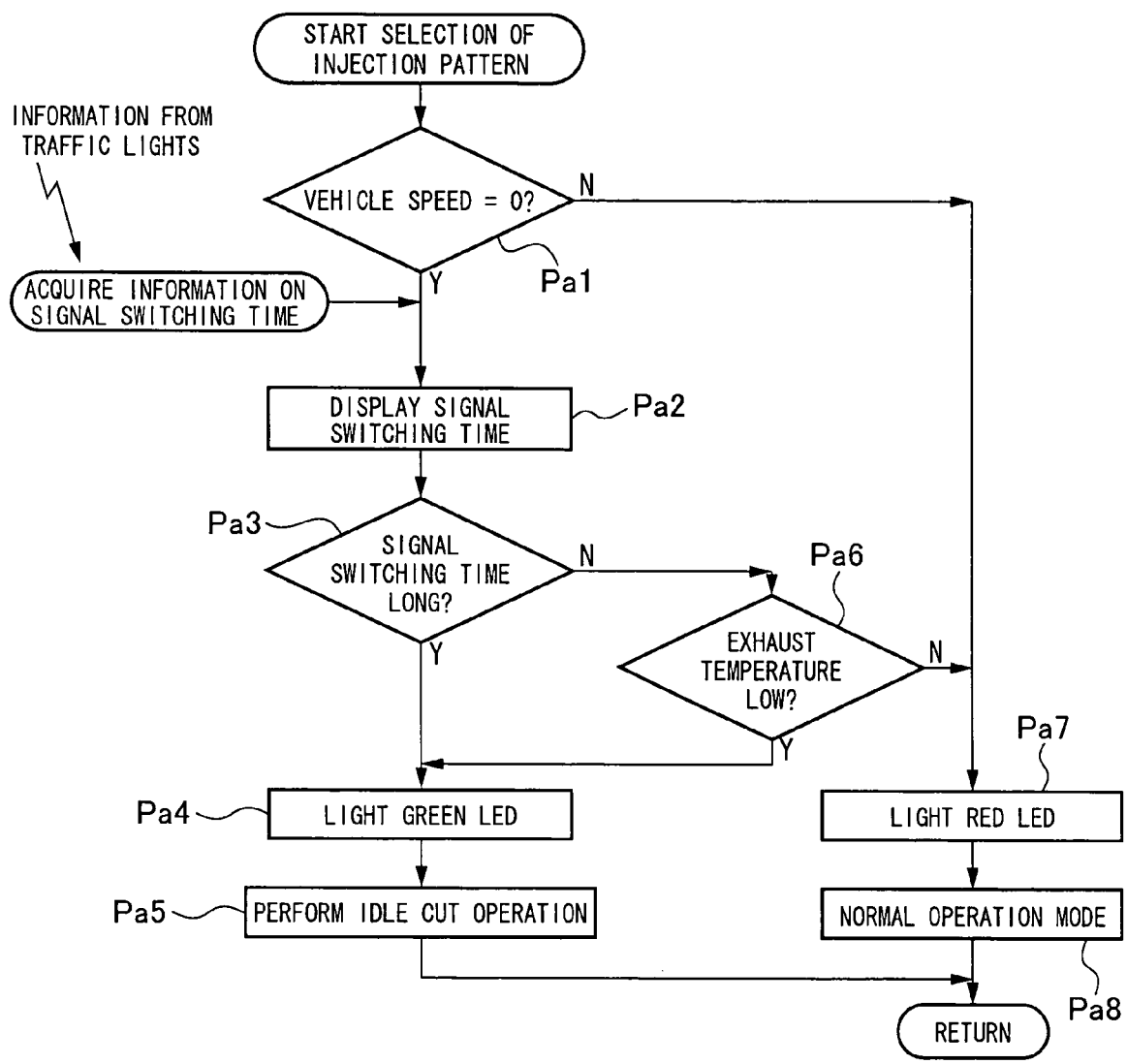
FIG. 2 is a flow chart for selection of an injection pattern.
Figure 3:
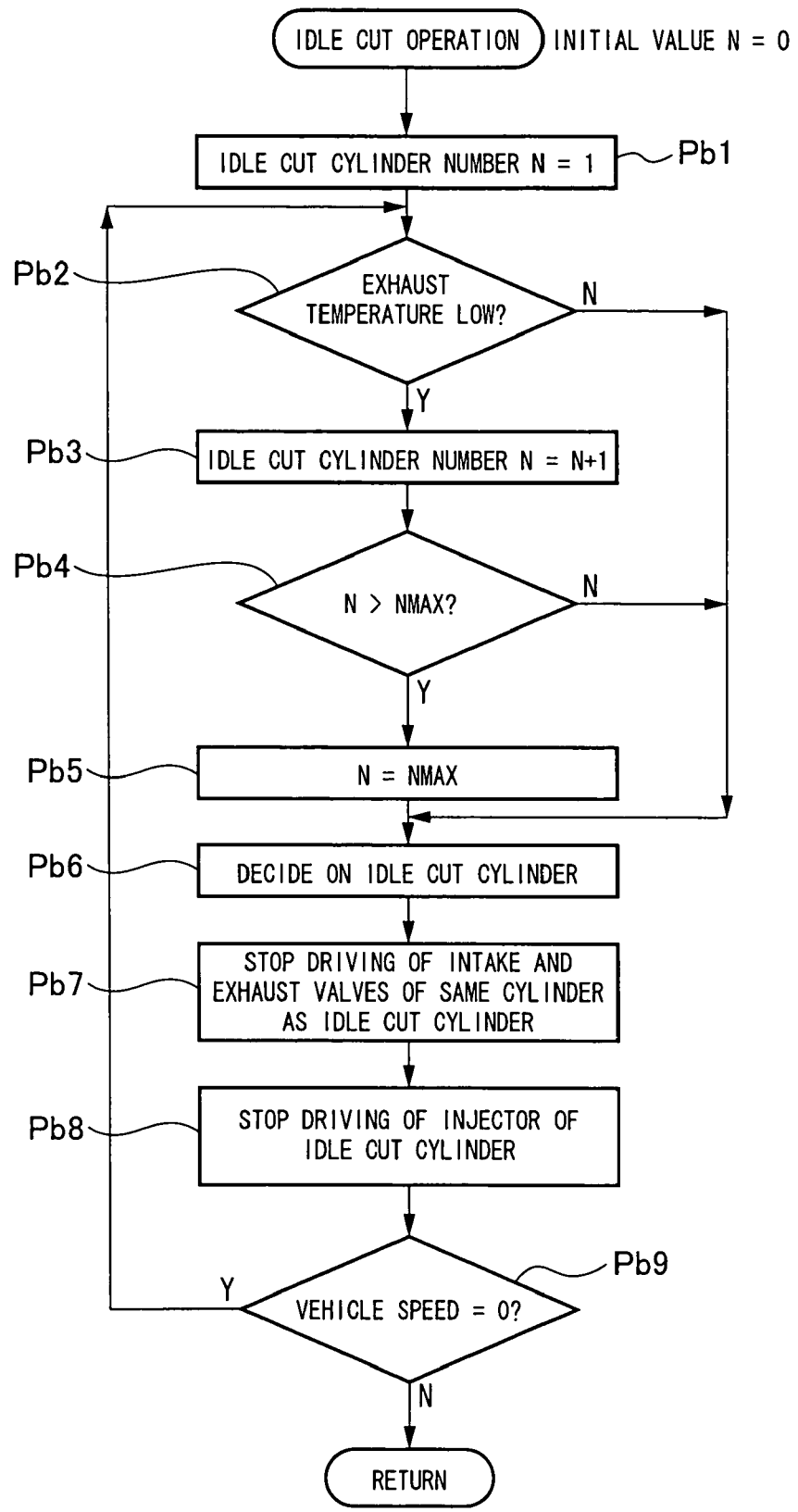
FIG. 3 is a flow chart for an idle cut operation.
Figure 4:
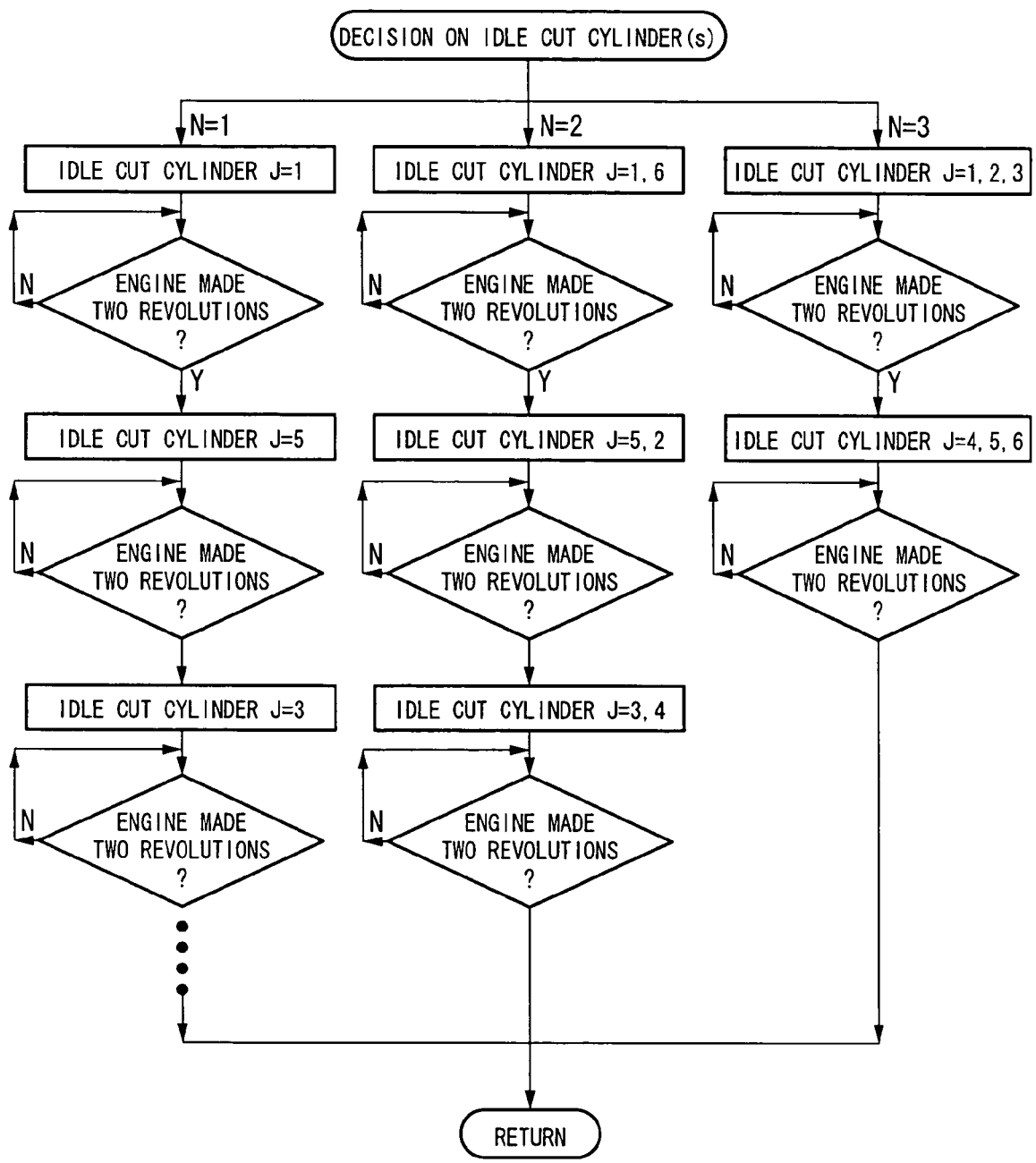
FIG. 4 is a flow chart for determination of an idle cut cylinder.
Figure 5:
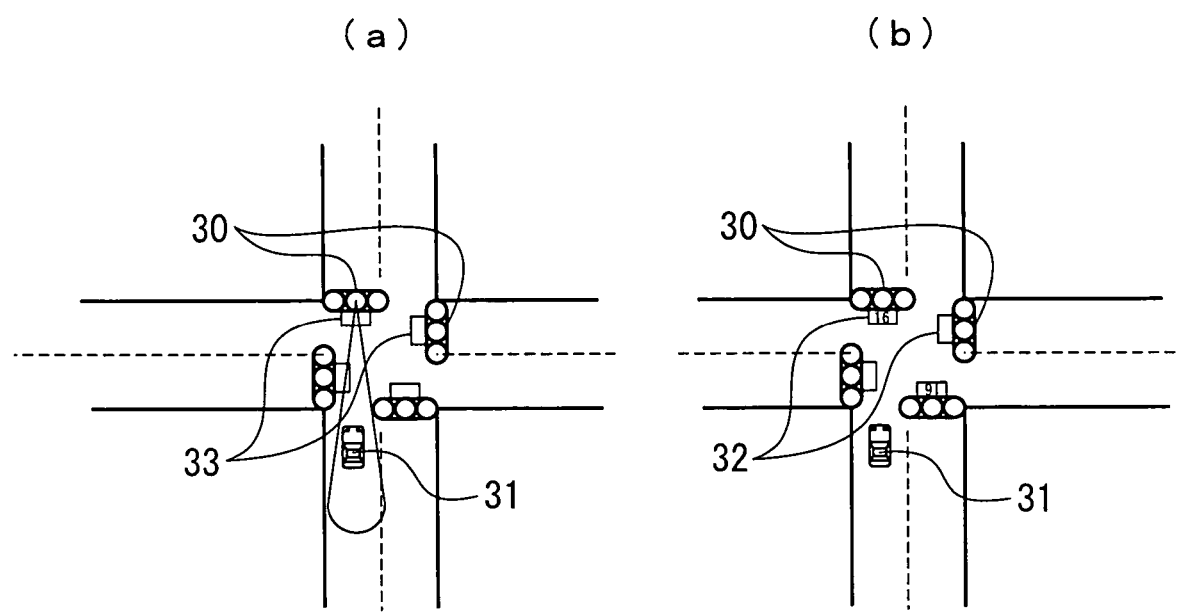
FIG. 5 is an explanation drawing of means for acquiring information on a traffic signal switching time.

FIG. 1 is a structural explanation drawing of a multi-cylinder internal combustion engine in a vehicle, such as an automobile, showing Embodiment 1 of the present invention. FIG. 2 is a flow chart for selection of an injection pattern. FIG. 3 is a flow chart for an idle cut operation. FIG. 4 is a flow chart for determination of an idle cut cylinder. FIG. 5 is an explanation drawing of means for acquiring information on a traffic signal switching time.

As shown in FIG. 1, a multi-cylinder internal combustion engine (hereinafter referred to simply as an engine) 1 having six cylinders, for example, is composed of a cylinder head 2 and a cylinder block 3. A piston 5 is slidably housed in each cylinder of the cylinder block 3 via a cylinder liner 4.

Each cylinder of the cylinder head 2 is provided with an intake valve 7 for opening and closing an intake port 6, and an exhaust valve 9 for opening and closing an exhaust port 8. The intake valve 7 and the exhaust valve 9 are driven to be opened and closed by an electronically controlled valve train.

That is, the intake valve 7 and the exhaust valve 9 are always urged upward in the drawing by valve springs 10a, 10b to be closed. When solenoids 11a, 11b are excited by control signals from an intake/exhaust valve electronic control unit (ECU) 12 as control means, the intake valve 7 and the exhaust valve 9 are move downward in the drawing against the urging force of the valve springs 10a, 10b to be opened.

The ECU 12 is composed of a central processing unit (CPU), a read only memory (ROM), and an interface as an input-output signal processing circuit. Based on information from a unit injector electronic control unit (ECU) 13, as control means, which is connected to the ECU 12 by communication means such as a control area network (CAN), the ECU 12 optimally controls the valve opening timings and the valve opening periods of the intake and exhaust valves 7 and 9 in accordance with the operating state of the engine 1.

Each cylinder of the cylinder head 2 is also provided with a unit injector 14 as an electronically controlled fuel injection system. The unit injector 14, as separately shown as a cross section separated from the engine 1 in the drawing, works in the following manner: The rotation of a cam 15 interlocked to the rotation of the engine 1 is transmitted to a rocker arm 18 via a cam follower 16 and a push rod 17, and a plunger 19 is pushed downward in the drawing by the rocker arm 18 against the urging force of a return spring 20, whereby fuel can be injected into the cylinder (combustion chamber). That is, the plunger 19 is pushed, whereby fuel within a fuel passage 21 is pressurized, and this pressurized fuel pushes a needle valve 22 upward in the drawing against the urging force of a return spring 23, with the result that a nozzle hole 24 is opened.

The injection volume and the injection timing of fuel are controlled by an electromagnetically driven poppet valve 25 which opens and closes the fuel passage 21. In detail, a solenoid 26 is excited by a control signal (opening and closing timing signal) from the aforementioned ECU 13, whereby the poppet valve 25 is attracted upward in the drawing against the urging force of a return spring 27, and is closed thereby (the fuel passage 21 is blocked). During this period, the fuel within the fuel passage 21 is pressurized under the pressure of the plunger 19, and can be injected. On the other hand, when the solenoid 26 is unexcited, so that the poppet valve 25 is moved downward by the urging force of the return spring 27, and is opened thereby (the fuel passage 21 is in communication). During this period, the fuel within the fuel passage 21 is not pressurized even under the pressure of the plunger 19, and thus cannot be injected.

The ECU 13, like the ECU 12, is composed of a central processing unit (CPU), a read only memory (ROM), an internal clock, and an interface as an input-output signal processing circuit. The ECU 13 receives various sensor signals, such as an engine rotational speed, an accelerator opening angle, various temperatures, such as the temperatures of cooling water and exhaust gas, various pressures, such as the pressures of intake air and exhaust gas, and vehicle speed. Based on such information received, the ECU 13 optimally controls the injection volume and the injection timing of the fuel from the unit injector 14 in accordance with the operating state of the engine 1.

The ECU 13 also receives a signal from a signal switching time radio wave transmitter 33 installed in a traffic light 30, and a signal from a receiver 13A installed on a vehicle 31, as shown in FIG. 5(*a*). Based on such signals, the ECU 13 exercises control for performing an idle cut operation (cylinder number control operation), in which fuel injection into some of the cylinders is stopped, and the intake valve 7 and the exhaust valve 9 of the cylinder concerned are kept closed via the ECU 12 connected by communication means such as a control area network (CAN), if the signal switching time is long (i.e., under predetermined conditions) during the idling of the engine 1 in the vehicle waiting at traffic lights.

The signal switching time radio wave transmitter 33 has a built-in transmission circuit for transmitting, by radio waves, signal switching time information (information on a time in which a signal is switched from red to green) which is controlled by an automobile overall traffic system such as VICS. The receiver 13A may be an on-board instrument on ETC (non-stop basis electronic toll collection system) which has, added thereto, the function of receiving signal switching time information from the signal switching time radio wave transmitter 33. Alternatively, the receiver 13A may be a dedicated receiver (may be incorporated in the ECU 13). The numeral 28 in FIG. 1 signifies a display installed on the automobile 31 for digitally displaying the signal switching time. The display 28 comprises, in combination, a green LED 29a which lights when the idle cut operation is active, and a red LED 29b which lights when the idle cut operation is not active.

Next, the aforementioned idle cut operation control will be described in detail with reference to flow charts of FIGS. 2 to 4.

As shown in FIG. 2, in selecting an injection pattern, the first step is to determine, based on the signal from the vehicle speed sensor, whether the vehicle speed is 0 (Step Pa1) If the vehicle speed is 0, signal switching time information (information on a time in which the signal switches from red to green) is acquired from the signal switching time radio wave transmitter 33 of the traffic light 30, and the signal switching time is displayed in Step Pa2. In Step Pa3, it is determined whether the signal switching time is long. If the vehicle speed is not 0 in Step Pa1, the program proceeds to Step Pa7 to light the red LED 29b, and a normal operation mode is executed in Step Pa8 to maintain the driving performance of the vehicle.

If, in the above-mentioned Step Pa3, the signal switching time is so long as to exceed a predetermined time, the program proceeds to Step Pa4 to light the green LED 29a, and an idle cut operation is performed in Step Pa5. If, in the Step Pa3, the signal switching time is so short as to be the predetermined time or less, on the other hand, it is determined in Step Pa6 based on the signal from the exhaust temperature sensor whether the exhaust gas temperature is low. If the exhaust gas temperature is low, the program proceeds to Step Pa4. If the exhaust gas temperature is not low, the program proceeds to Step Pa7 to avoid an unnecessary idle cut operation, maintaining restart performance of the vehicle.

As shown in FIG. 3, in performing an idle cut operation, an idle cut cylinder number N is set at N=1 (initial value N=0) in Step Pb1. Then, in Step Pb2, a determination is made as to whether the exhaust gas temperature is low. If the exhaust gas temperature is low, the idle cut cylinder number N is incremented in accordance with the exhaust gas temperature in Step Pb3. Then, in Step Pb4, it is determined whether the incremented idle cut cylinder number N has exceeded a critical cylinder number Nmax (e.g., 3 cylinders in the case of the engine 1 with 6 cylinders). If the answers are NO in Steps Pb2 and Pb4, the program proceeds to Step Pb6 to decide on the idle cut cylinder in accordance with an algorithm for deciding on the idle cut cylinder as shown in FIG. 4.

If the answer is YES in Step Pb4, the idle cut cylinder number N is set at the critical cylinder number Nmax in Step Pb5, and then a determination of the idle cut cylinder is made in Step Pb6. Then, in Step Pb7, driving of the intake valve 7 and the exhaust valve 9 of the same cylinder as the idle cut cylinder is stopped. Also, driving of the unit injector 14 of the idle cut cylinder is stopped in Step Pb8. That is, power supply to the solenoids 11a, 11b of the intake valve 7 and the exhaust valve 9 is cut off to keep these valves closed, and power supply to the solenoid 26 of the unit injector 14 is also cut off to shut off fuel injection.

Finally, the above-described idle cut operation is continued until the vehicle restarts in Step Pb9. A determination of whether the vehicle speed is zero in Step Pb9 can be shared with Step Pa1 shown in FIG. 2, and is not absolutely necessary.

In deciding on the idle cut cylinder stated above, if the idle cut cylinder number N is N=1, the idle cut cylinder J is changed like J=1→J=5→J=3→J=6→J=2→J=4 for two revolutions of the engine, as shown in FIG. 4. If the idle cut cylinder number N is N=2, the idle cut cylinder J is changed, for example, like J=1, 6→J=5, 2→J=3, 4 for two revolutions of the engine. If the idle cut cylinder number N is N=3, the idle cut cylinder J may be changed like J=1, 2, 3→J=4, 5, 6 for two revolutions of the engine.

According to the present embodiment, as described above, when the engine 1 is idling while the vehicle is waiting at traffic lights, an idle cut operation is performed in which fuel injection into some of the cylinders is shut off, and the intake valve 7 and the exhaust valve 9 of the cylinder concerned are kept closed. In the cylinders other than the idle cut cylinder, therefore, the amount of fuel injection per cylinder is increased, with the result that the exhaust gas temperature rises, and the ignition of the engine 1 is stabilized. Thus, a broader fuel injection timing can be selected, and better fuel economy or less pollution can be achieved. That is, as contrasted with idle stop control, the aggravation of exhaust emissions at restart of the engine 1 can be avoided, and the driving frequency of the self-starting motor is decreased, delaying the wear of this motor.

During the idle cut operation, moreover, the intake valve 7 and the exhaust valve 9 of the idle cut cylinder are also closed. Thus, pumping losses are decreased by the adiabatic compression and expansion of the cylinder concerned, with the result that even better fuel economy is achieved, and a driving current for the valve train can be decreased.

During the idle cut operation, moreover, the idle cut cylinder number is varied according to the exhaust gas temperature. Thus, a fall in the exhaust gas temperature can be prevented, and the activity of posttreatment devices, such as DPF, NOx reduction catalyst, and oxidation catalyst, can be maintained at a high level.

Besides, the idle cut cylinder is changed with the passage of time (the rotational speed of the engine 1). Thus, a marked imbalance in the temperature distribution of the engine 1 can be eliminated, and the reliability of the engine 1 can be ensured. It is also advisable to detect the exhaust gas temperature of each cylinder and change the idle cut cylinder based on this detected temperature.

As contrasted with idle stop control, there is no need for a braking pressure checking mechanism, or for detection of the state of the transmission for preventing danger at the restart of the vehicle. Thus, the control system can be simplified, the reliability of the apparatus can be increased, and cost reduction can be achieved.

Embodiment 2

Figure 6:
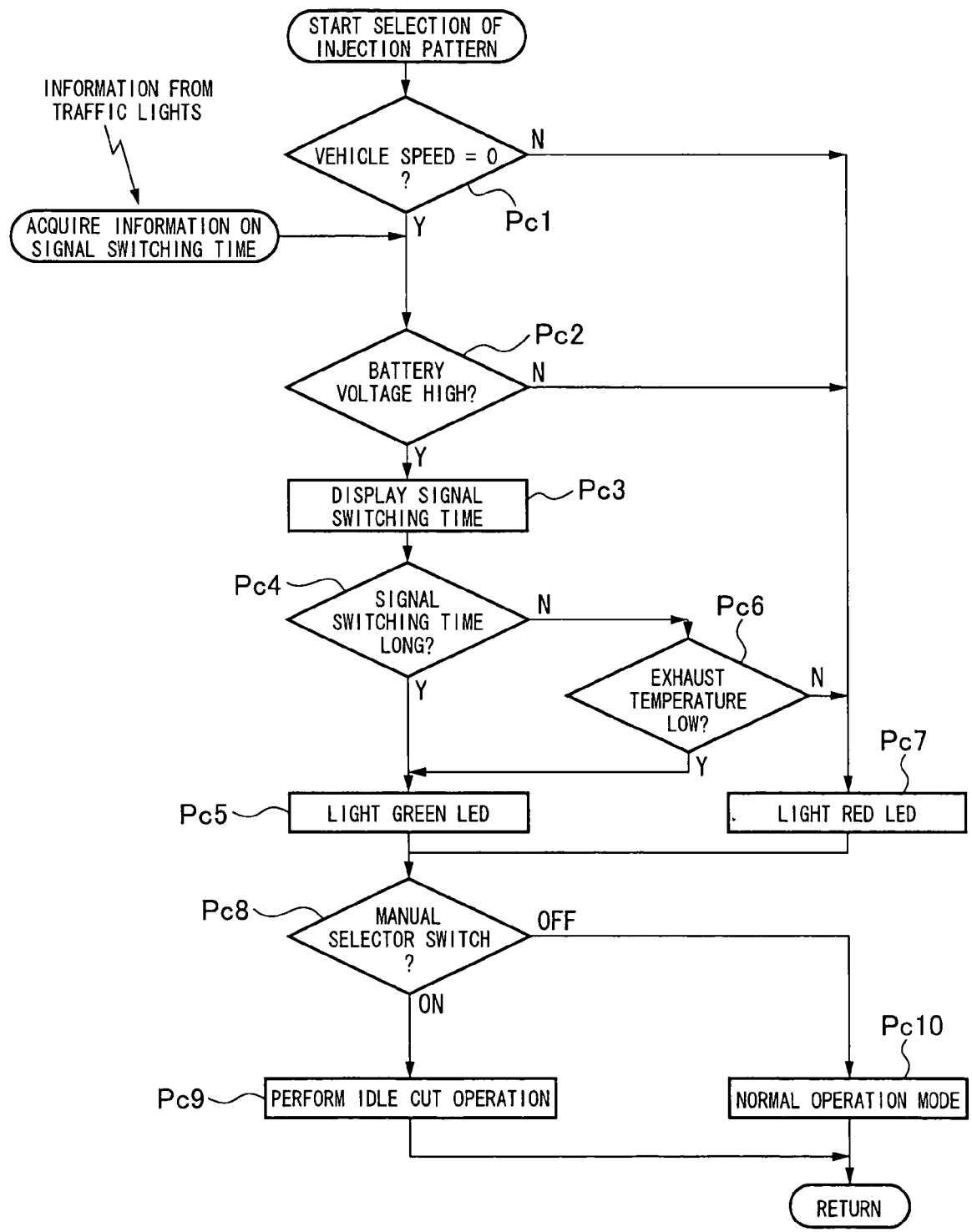
FIG. 6 is a flow chart for selection of an injection pattern showing Embodiment 2 of the present invention.

FIG. 6 is a flow chart for selecting an injection pattern showing Embodiment 2 of the present invention.

In the controlling actions of the electronic control units (ECU) 12, 13 in Embodiment 1, after determination of the vehicle speed (see Step Pc1), the battery voltage is determined (see Step Pc2). If the battery voltage is high, and the signal switching time is long, the green LED is lit. If the exhaust gas temperature is low even when the signal switching time is short (see Steps Pc3 to Pc7), the green LED is lit. By lighting the green LED, recommendation for an idle cut is displayed to the driver. If the signal switching time is short, and the exhaust gas temperature is high, the red LED is lit to recommend the driver not to use an idle cut. The electronic control units, as noted above, judge only which of use and non-use of the idle cut is recommendable. Regardless of the indication by the electronic control units, the driver turns on or off a manual selector switch, at the driver's own discretion, thereby becoming able to carry out an idle cut operation, or refraining from performing an idle cut operation (see Steps Pc8 to Pc9). On this occasion, it is preferred for the driver to acquire signal switching time information visually from the signal switching time display devices 32 mounted on the traffic lights 30, as shown in FIG. 5(b). A determination of the battery voltage in Step Pc2 is not essential.

According to the present Embodiment 2, the same actions and effects as those in Embodiment 1 are obtained, except that an idle cut operation can be performed at the driver's discretion, regardless of the operating state.

Embodiment 3

FIG. 6-A is a flowchart for selecting an injection pattern showing Embodiment 3 of the present invention.

In the controlling actions of the electronic control units (ECU) 12, 13 in Embodiment 1, after determination of the vehicle speed (see Step Pca1), a manual selector switch is turned on or off at the driver's discretion (see Step Pca2). By turning on the manual selector switch, an idle cut operation is performed. By turning off the manual selector switch, a determination of whether to perform an idle cut is entrusted to the electronic control units (see Step Pca3). On this occasion, it is preferred for the driver to acquire signal switching time information visually from the signal switching time display devices 32 mounted on the traffic lights 30, as shown in FIG. 5(b). A determination of the battery voltage in Step Pca3 is not essential.

According to the present Embodiment 3, the same actions and effects as those in Embodiment 1 are obtained, except that an idle cut operation can be performed at the driver's discretion, regardless of the operating state.

Embodiment 4

Figure 7:
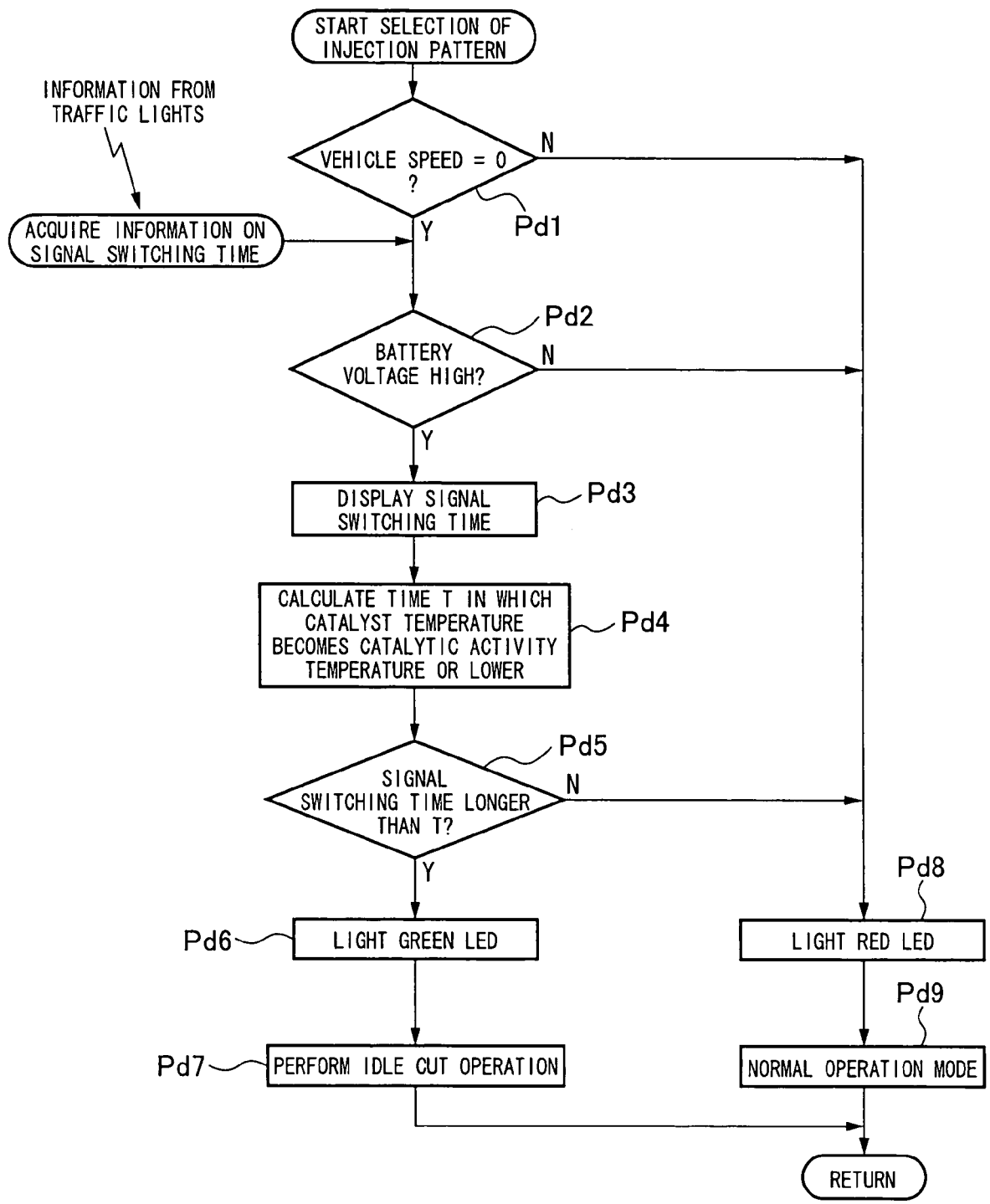
FIG. 7 is a flow chart for selection of an injection pattern showing Embodiment 4 of the present invention.

FIG. 7 is a flow chart for selecting an injection pattern showing Embodiment 4 of the present invention.

In the controlling actions of the electronic control units (ECU) 12, 13 in Embodiment 1 or Embodiment 2, after display of the signal switching time (see Step Pd3), a time T, in which the catalyst temperature detected by the catalyst temperature sensor or the like becomes a predetermined catalytic activity temperature or lower, is calculated from the heat capacity of the catalyst, the exhaust gas temperature, and the exhaust gas flow rate (see Step Pd4). A determination is made as to whether the above signal switching time is longer than this time T (see Step Pd5). If the signal switching time is longer than the time T, the green LED 29a is lit to perform an idle cut operation (see Step Pd6 and Step Pd7). If the signal switching time is shorter than the time T, the red LED 29b is lit to execute a normal operation mode (see Step Pd8 and Step Pd9). On this occasion, a determination of the battery voltage in Step Pd2 is not essential.

According to the present Embodiment 4, the effect that such control as not to lower catalytic activity in any operating state can be produced, in addition to the same actions and effects as described in Embodiment 1 and Embodiment 2. That is, if the catalytic activity lowers even when the signal switching time is short, a determination is made that an advantageous influence will be exerted on the environment. Based on this determination, an idle cut operation is performed. If the catalytic activity does not lower even when the signal switching time is long, a determination is made that a disadvantageous influence will be exerted on the environment. Based on this determination, no idle cut operation is performed. By these measures, changes in revolutions and occurrence of noises associated with control switching are prevented.

Embodiment 5

Figure 8:
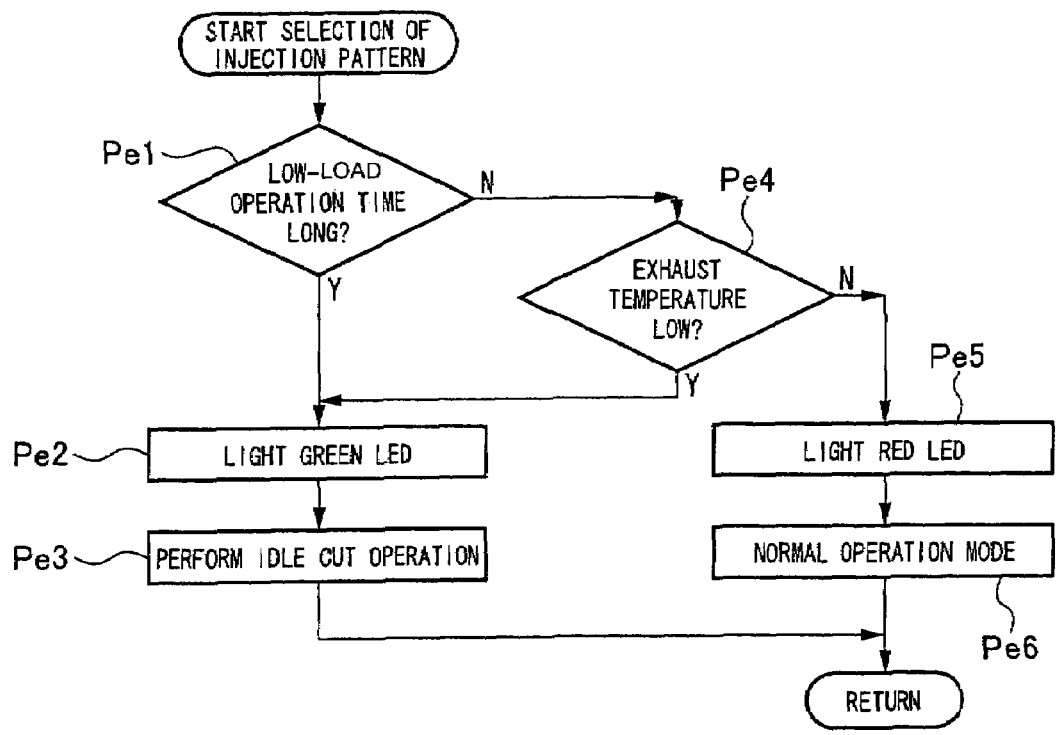
FIG. 8 is a flow chart for selection of an injection pattern showing Embodiment 5 of the present invention.

FIG. 8 is a flow chart for selecting an injection pattern showing Embodiment 5 of the present invention.

In the controlling actions of the electronic control units (ECU) 12, 13 in Embodiment 1, external information such as information from traffic lights is not relied on, but when a light load operating state, including idling, whose duration has exceeded a predetermined time, is detected by a timer (internal clock), an idle cut operation (cylinder number control operation) can be performed.

According to the present Embodiment 5, the same actions and effects as those in Embodiment 1 are obtained, except that controlling actions are simplified.

While the present invention has been described by the foregoing embodiments, it is to be understood that the invention is not limited thereby, but may be varied in many other ways. For example, the control device for an internal combustion engine according to the present invention can be widely applied not only to a vehicle, such as an automobile, but also to a stationary internal combustion engine. Such variations are not to be regarded as a departure from the spirit and scope of the invention, and all such modifications as would be obvious to one skilled in the art are intended to be included within the scope of the appended claims.

What is claimed is:

1. A control device for a multi-cylinder internal combustion engine including a plurality of cylinders, an electronically controlled fuel injection system for injecting fuel into each of said cylinders, and an electronically controlled valve train for opening and closing an intake valve and an exhaust valve of each of said cylinders, said control device comprising:

operating state detection means for detecting an operating state of said internal combustion engine; and control means for performing a cylinder number control operation, in which fuel injection into some of said cylinders is stopped, and said intake valve and said exhaust valve of said cylinder concerned are kept closed, under predetermined conditions when a low- to medium-load operating state, including idling, is detected by said operating state detection means.

2. The control device for a multi-cylinder internal combustion engine according to claim 1, wherein said control means changes said cylinder undergoing said cylinder number control operation, or a number of said cylinder, in accordance with said operating state of said internal combustion engine.

3. The control device for a multi-cylinder internal combustion engine according to claim 1, wherein said control means performs said cylinder number control operation based on switching time information on traffic signals, or an external command from a manual selector switch.

4. The control device for a multi-cylinder internal combustion engine according to claim 3, wherein said control means acquires said switching time information on traffic signals via a receiver which receives said switching time information on traffic signals transmitted by a signaling device.

5. The control device for a multi-cylinder internal combustion engine according to claim 4, wherein said receiver is an on-board instrument on ETC.

6. The control device for a multi-cylinder internal combustion engine according to claim 1, wherein said control means incorporates an algorithm for determining, based on said operating state of said internal combustion engine and switching time information on traffic signals, whether it is advantageous to an environment to change said cylinder undergoing said cylinder number control operation or a number of said cylinder.

7. The control device for a multi-cylinder internal combustion engine according to claim 1, wherein said control means performs said cylinder number control operation when said low- to medium-load operating state, including idling, whose duration has exceeded a predetermined time, is detected by a timer.

8. A signaling device capable of providing information to a control device for a multi-cylinder internal combustion engine, said internal combustion engine including a plurality of cylinders, an electronically controlled fuel injection system for injecting fuel into each of said cylinders, and an electronically controlled valve train for opening and closing an intake valve and an exhaust valve of each of said cylinders, said control device comprising:

operating state detection means for detecting an operating state of said internal combustion engine; and control means for performing a cylinder number control operation, in which fuel injection into some of said cylinders is stopped, and said intake valve and said exhaust valve of said cylinder concerned are kept closed, under predetermined conditions when a low- to medium-load operating state, including idling, is detected by said operating state detection means, said signaling device being adapted to display information on a time in which a traffic signal is switched from red to green, or to transmit said information to said control means by a radio wave.

9. A control device for a multi-cylinder internal combustion engine including a plurality of cylinders, a fuel injection system for injecting fuel into each of said cylinders, and a valve train for opening and closing an intake valve and an exhaust valve of each of said cylinders, said control device comprising:

an operating state detection unit that detects an operating state of said internal combustion engine; and a control unit that performs a cylinder number control operation, in which fuel injection into some of said cylinders is stopped, and said intake valve and said exhaust valve of said cylinder concerned are kept closed, under predetermined conditions when a low- to medium-load operating state, including idling, is detected by said operating state detection unit.

10. A signaling device capable of providing information to a control device for a multi-cylinder internal combustion engine, said internal combustion engine including a plurality of cylinders, a controlled fuel injection system for injecting fuel into each of said cylinders, and a valve train for opening and closing an intake valve and an exhaust valve of each of said cylinders, said control device comprising:

an operating state detection unit that detects an operating state of said internal combustion engine; and a control unit that performs a cylinder number control operation, in which fuel injection into some of said cylinders is stopped, and said intake valve and said exhaust valve of said cylinder concerned are kept closed, under predetermined conditions when a low- to medium-load operating state, including idling, is detected by said operating state detection unit, said signaling device being adapted to display information on a time in which a traffic signal is switched from red to green, or to transmit said information to said control unit by a radio wave.

* * * * *